March 31, 1931.  N. RAMEN  1,799,121
DIRECTION INDICATOR
Filed March 13, 1930  2 Sheets-Sheet 1
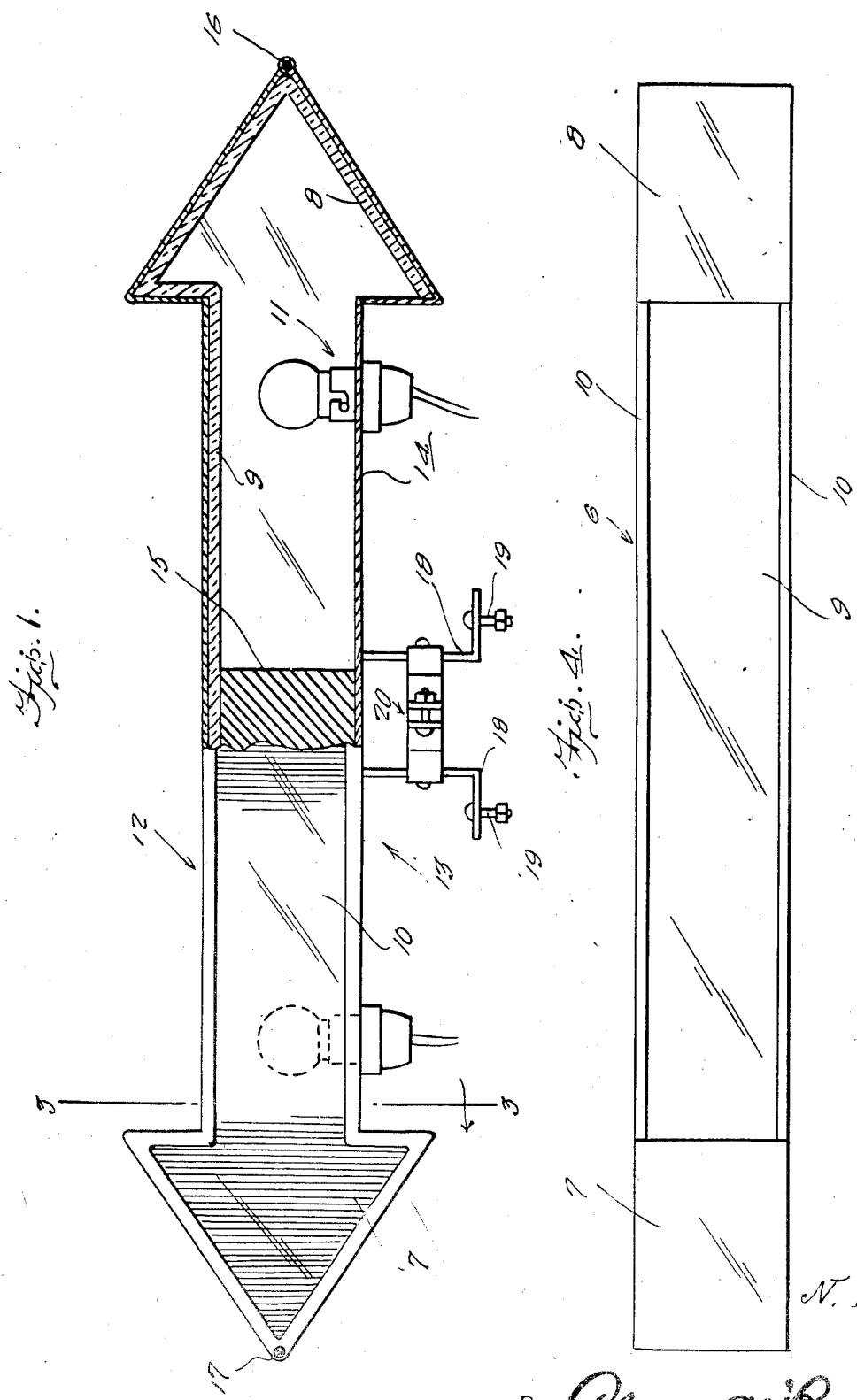

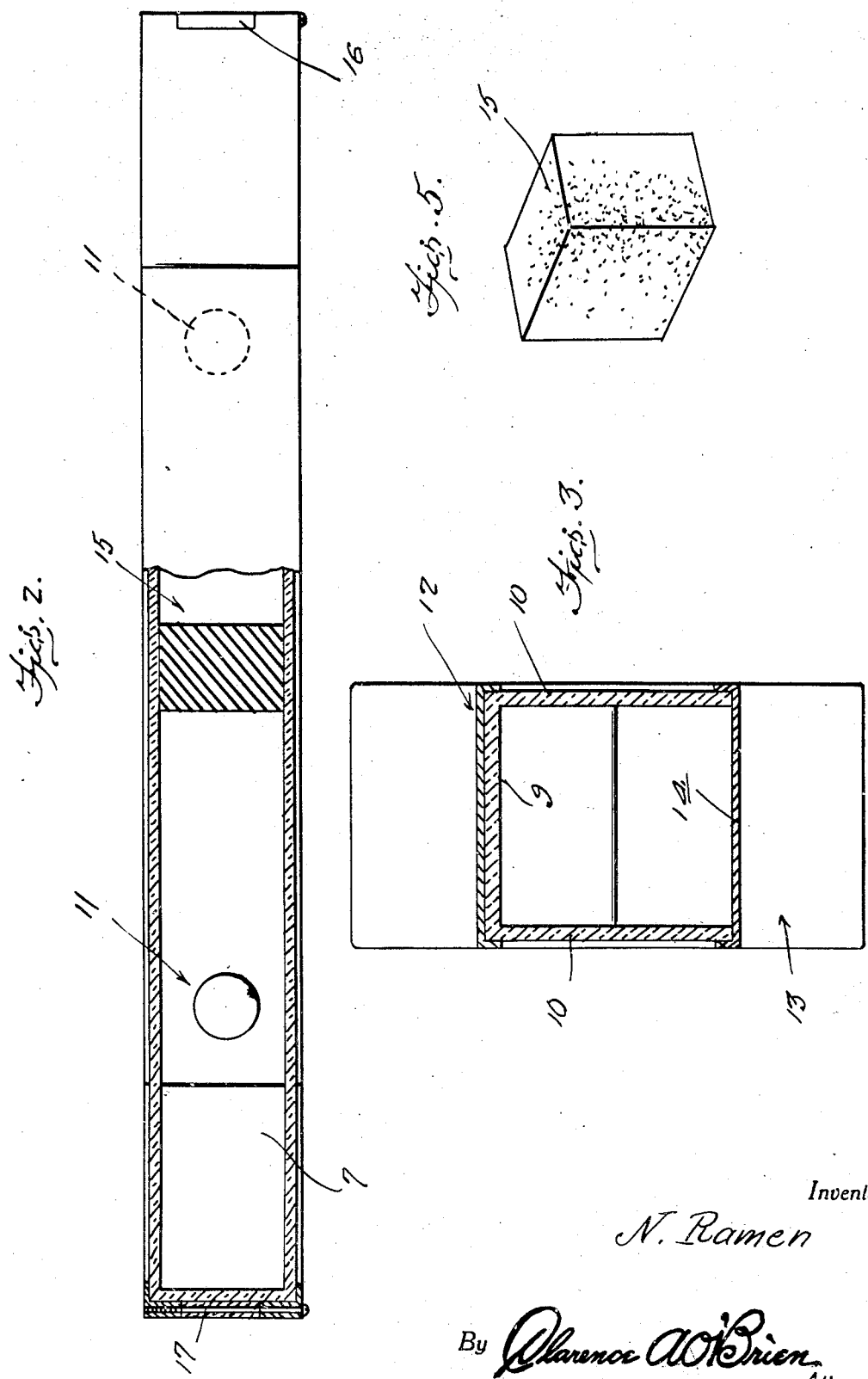

Patented Mar. 31, 1931

1,799,121

UNITED STATES PATENT OFFICE

NORMAN RAMEN, OF EAST AURORA, NEW YORK

DIRECTION INDICATOR

Application filed March 13, 1930. Serial No. 435,517.

This invention relates to certain new and useful improvements and structural refinements embodied in the construction of a practical type of direction indicator such as may be placed on the rear of the car, on the fender, or some other conveniently located point.

The purpose of the invention is to provide a simple and economical direction signal chiefly for use in connection with motor vehicles, whereby to indicate the intention of the driver when about to make a turn to the right or the left, so that companion drivers of following and adjacent vehicles may govern themselves accordingly and obviate confusion and accidents.

In carrying the invention into practice, I have evolved and produced a structure which is characterized by a novel arrangement of parts so associated as to make a relatively new direction indicator which, structurally speaking, constitutes a distinguishable contribution to the prior art.

The particular structural details and their mechanical association and arrangement will become more readily apparent from the following description and drawings.

In the drawings:

Figure 1 is a rear elevational view of a direction signal constructed in accordance with the present invention, portions being broken away and shown in section to disclose the relationship of parts.

Figure 2 is a top plan view of the structure seen in Figure 1 with the left hand portion shown in section.

Figure 3 is a horizontal cross section on the line 3—3 of Figure 1.

Figure 4 is a bottom plan view of the hollow cast glass body constituting a major element of the construction.

Figure 5 is a perspective view of a combined partitioning and shock absorbing element.

A primary part of the structural assembly is shown in Figure 4 and generally designated by the reference character 6. This is in the nature of a hollow glass box-like casing. It is molded from a single piece of glass and has its opposite ends formed with direction indicating arrow heads 7 and 8 respectively. The top wall 9 is solid and the side walls 10 are also solid. The bottom is open. The entire glass structure is preferably red in color.

Incidently, the purpose of the open bottom is to facilitate placement and removal of the electric lighting fixtures, generally designated by the numerals 11. These each include a socket and a bulb. The metallic frame structure includes upper and lower half sections 12 and 13 respectively suitably shaped to conform to the configuration of the glass housing 6. The solid portion 14 of the lower section constitutes a closure for the open bottom of the part 6. In fact, it constitutes a mounting for the illuminating bulbs 11.

In addition, it provides a support for the rubber shock absorbing and partitioning block 15. This block serves to divide the glass box into right and left compartments for indicating right and left directions respectively. The sections 12 and 13 are hingedly connected together at one end as at 16. The opposite ends are formed with knuckles to receive the retaining pin 17. This serves to clamp the hingedly connected sections of the frame structure around the glass box-like body 6.

The portion 14 is provided with L-shaped attaching brackets 18 having connecting bolts 19. The numeral 20 designates a suitable clamping element. In practice, any suitable attaching means may be provided for mounting the device either on the fender or elsewhere on the body in a conveniently located position.

The gist of the invention is in the provision of a simplified and economical direction indicator characterized by the one-piece glass body of hollow construction having an open bottom and the oppositely disposed pointed arrow head, together with the enclosing metallic frame-work which constitutes a protective casing structure wherein this frame embodies a lower section 13 provided with the solid wall 14 functioning as a support for the rubber block 15 as well as the renewable bulb 11. This permits access to the interior for replacement and repair.

It is thought that the structure herein shown and described constitutes a novel and distinguishable contribution to the prior art which is advantageous and which will fulfill the requirements of a structure of this class.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a direction signal of the class described, a hollow glass body constituting a light housing and having an open bottom and a closed top, spaced parallel side walls, and enlarged end portions forming arrow heads for direction indicating purposes, and a metallic casing structure for said body having portions shaped to conform to the companion portion of said body and including a bottom plate constituting a closure for the open bottom of said body, and complemental open frame-like portions forming side and top sight openings, electric lighting fixtures mounted at longitudinally spaced points on said bottom plate, and a shock absorbing and partitioning block mounted on said plate and disposed within said body to divide it into individual compartments.

2. As a new product of manufacture, a vehicle direction signal of the class described comprising a one-piece hollow glass body formed at its opposite ends with arrow-shaped enlargements constituting direction indicating elements, a metallic openwork protective casing therefor comprising upper and lower complemental sections hingedly connected together at one end and provided at the opposite ends with complemental knuckles provided with a retaining pin, and attaching means carried by the intermediate portion of the lower section of said casing.

In testimony whereof I affix my signature.

NORMAN RAMEN.